(12) United States Patent
Kim (10) Patent No.: US 7,643,098 B2
(45) Date of Patent: Jan. 5, 2010

(54) BROADCAST RECEIVING APPARATUS AND CONTROL METHOD THEREOF

(75) Inventor: Tae-hwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 730 days.

(21) Appl. No.: 11/288,228

(22) Filed: Nov. 29, 2005

(65) Prior Publication Data

US 2006/0116093 A1    Jun. 1, 2006

(30) Foreign Application Priority Data

Nov. 30, 2004   (KR)   ............... 10-2004-0099080

(51) Int. Cl.
*H04N 5/63* (2006.01)
(52) U.S. Cl. .................................. 348/731
(58) Field of Classification Search .......... 348/731, 348/725, 732, 570, 569
See application file for complete search history.

(56) References Cited

U.S. PATENT DOCUMENTS

| 4,914,516 | A | * | 4/1990 | Duffield | 348/565 |
| 5,420,642 | A | * | 5/1995 | Baek | 348/565 |
| 5,506,628 | A | * | 4/1996 | Chun | 348/565 |
| 5,987,313 | A | * | 11/1999 | Lee | 455/186.1 |
| 6,038,433 | A | * | 3/2000 | Vegt | 455/161.1 |
| 6,392,716 | B1 | * | 5/2002 | Nagata et al. | 348/731 |
| 6,400,421 | B1 | * | 6/2002 | Sakakibara | 348/732 |
| 6,681,285 | B1 | * | 1/2004 | Ng | 710/309 |
| 7,225,458 | B2 | * | 5/2007 | Klauss et al. | 725/63 |
| 2002/0097344 | A1 | | 7/2002 | Shibusawa | |
| 2003/0196211 | A1 | | 10/2003 | Chan | |
| 2003/0226153 | A1 | | 12/2003 | Bessel et al. | |
| 2004/0036811 | A1 | | 2/2004 | Ikeguchi | |
| 2004/0051816 | A1 | | 3/2004 | Ikeguchi | |

FOREIGN PATENT DOCUMENTS

| CN | 1402535 A | 3/2003 |
| EP | 0 834 991 A1 | 4/1998 |
| JP | 2004-112079 A | 4/2004 |
| KR | 2000-0040871 A | 7/2000 |
| KR | 2001-0060382 A | 7/2001 |
| KR | 2004-0007730 A | 1/2004 |

\* cited by examiner

*Primary Examiner*—Paulos M Natnael
(74) *Attorney, Agent, or Firm*—Sughrue Mion, PLLC (57) ABSTRACT

A broadcast receiving apparatus and a control method thereof, in which a plurality of tuners performs respectively a channel quick-searching operation and a channel fine-searching operation at the same time, so that receiving channels are quickly and accurately searched, thereby performing a channel preset. The apparatus and control method utilize a first tuner and a second tuner, including tuning a first channel using the first tuner; determining the presence of a synchronous signal in a first broadcast signal of the first channel tuned through the first tuner; retuning the first channel using the second tuner; and determining the presence of a right turning point in a second broadcast signal of the first channel retuned through the second tuner.

34 Claims, 5 Drawing Sheets

BROADCAST RECEIVING APPARATUS AND CONTROL METHOD THEREOF

CROSS-REFERENCE TO RELATED APPLICATIONS

This application is based upon and claims the benefit of priority from Korean Patent Application No. 2004-0099080, filed on Nov. 30, 2004, in the Korean Intellectual Property Office, the disclosure of which is incorporated herein in its entirety by reference.

BACKGROUND OF THE INVENTION

1. Field of the Invention

The invention relates to a broadcast receiving apparatus and a control method thereof, and more particularly, to a broadcast receiving apparatus, and a control method thereof, in which a plurality of tuners are used to quickly search for a tunable channel, thereby performing a channel preset operation.

2. Description of the Related Art

Many devices such as a television (TV), a videotape recorder (VTR), a personal computer (PC), etc. utilize a broadcast receiving apparatus to receive a cable and/or wireless broadcast, so that a user can view the broadcast thereon. Typically, channels allocated for a plurality of broadcasts utilize different frequencies and have different frequency intervals therebetween, according to various international broadcasting standards such as national television system committee (NTSC), phase alternation line (PAL), sequential couleur a memoire (SECAM), etc. In each of these standards, many different channels are available.

Some of the available channels do not carry broadcast signals. Thus, a user may set which channels in a particular device receive broadcast signals from a broadcast signal source, by way of a channel preset operation. Then, the user may select a channel among the preset channels when he/she wants to view a broadcast thereon.

Additionally, as new broadcast signal sources such as a wire broadcast, cable TV, satellite broadcast, etc. have been developed in addition to airwave broadcasts, the number of available channels has increased even further.

Meanwhile, broadcast receiving apparatuses have been developed that provide a plurality of tuners, and display images using a picture-in-picture (PIP) function.

In the case where the broadcast receiving apparatus with the PIP function comprises two tuners, the channel preset operation is performed for all channels by employing one tuner as a main tuner and the other tuner as an auxiliary tuner for the PIP function. In this case, the main tuner of the broadcast receiving apparatus receives a broadcast signal of a first channel corresponding to a first predetermined frequency and divides it into a video signal and an audio signal. Then, the main tuner determines whether the video signal includes a synchronous signal. When the video signal includes such a synchronous signal, the main tuner detects whether the frequency corresponding to the receiving channel includes a right tuning point. If so, the receiving frequency is finely adjusted, and then a channel number and the finely adjusted frequency of the corresponding channel are stored in a separate channel memory or the like.

When the receiving frequency and the channel number of a channel are completely set, the main tuner searches the following channel and repeats the foregoing setting process. Likewise, the main tuner repeats the foregoing process with regard to all available channels.

Thus, in the related art broadcast receiving apparatus, a channel is set on the basis of the synchronous signal and the right tuning point related thereto, and then the following channels are sequentially searched. However, if the number of available channels is very large, it takes very long for such a broadcast receiving apparatus to perform the channel preset operation. Further, there is a limit to the usability of the broadcast receiving apparatus while performing the channel preset, so that a user satisfaction is lowered.

SUMMARY OF THE INVENTION

Accordingly, it is an aspect of the invention to provide a broadcast receiving apparatus and a control method thereof, in which a plurality of tuners performs respectively a channel quick-searching operation and a channel fine-searching operation at once, so that a channel preset is performed quickly and accurately searching a receiving channel.

Additional aspects and/or advantages of the invention will be set forth in part in the description which follows and, in part, will be obvious from the description, or may be learned by practice of the invention.

The foregoing and/or other aspects of the invention are achieved by providing a broadcast receiving apparatus including: a first tuner to tune a first channel; a second tuner to retune the first channel; and a controller to determine the presence of a synchronous signal in a first broadcast signal of the first channel tuned through the first tuner, and to determine a right turning point in a second broadcast signal of the first channel retuned through the second tuner.

According to another aspect of the invention, the controller may temporarily store a temporary channel number and a receiving frequency of the first channel when the synchronous signal is determined to be present in the first broadcast signal.

According to another aspect of the invention, the controller may control the second tuner to retune the first channel using the stored temporary channel number and frequency.

According to another aspect of the invention, the broadcast receiving apparatus may further include an input part to allow a user to select a channel searching mode, wherein the first tuner operates according to the selected channel searching mode According to another aspect of the invention, the controller may control the first tuner to tune a second channel while the second tuner retunes the first channel.

According to another aspect of the invention, the controller may determine the presence of a synchronous signal in a third broadcast signal of the second channel through the first tuner.

According to another aspect of the invention, the controller may control the first tuner to immediately tune a second channel when the synchronous signal is not present in the first broadcast signal.

According to another aspect of the invention, the controller may finely adjust the frequency of the retuned first channel when the right turning point is present in the second broadcast signal.

According to another aspect of the invention, the controller may store the finely adjusted frequency and a channel number of the first channel.

According to another aspect of the invention, the controller may control the second tuner to retune a second channel after the frequency of the retuned first channel is finely adjusted.

According to another aspect of the invention, the controller may control the first tuner to sequentially tune a plurality of other channels.

According to another aspect of the invention, the controller may control the second tuner to immediately retune a second channel when the right tuning point is not present in the second broadcast signal.

According to another aspect of the invention, the controller may determine the presence of a right tuning point in a fourth broadcast signal of the second channel through the second tuner.

According to another aspect of the invention, the broadcast receiving apparatus may further comprise a channel memory to store a channel number and a receiving frequency of the first channel tuned through the first or second tuner.

The foregoing and/or other aspects of the invention are also achieved by providing a method of controlling a broadcast receiving apparatus comprising first and second tuners, the method including tuning a first channel using the first tuner; determining the presence of a synchronous signal in a first broadcast signal of the first channel tuned through the first tuner; retuning the first channel using the second tuner; and determining the presence of a right turning point in a second broadcast signal of the first channel retuned through the second tuner.

According to another aspect of the invention, the method may further include temporarily storing a temporary channel number and a frequency of the first channel when the synchronous signal is determined to be present in the first broadcast signal.

According to another aspect of the invention, the method may further include retuning the first channel using the second tuner comprises tuning the second tuner using the stored temporary channel number and frequency.

According to another aspect of the invention, the method may further include selecting a channel searching mode to be performed according to user inputs through an input part, wherein the tuning of the first channel using the first tuner is performed according to the selected channel searching mode.

According to another aspect of the invention, the method may further include tuning a second channel using the first tuner while the retuning of the first channel using the second tuner occurs.

According to another aspect of the invention, the method may further include determining the presence of a synchronous signal in a third broadcast signal of the second channel through the first tuner.

According to another aspect of the invention, the method may further include immediately tuning a second channel using the first tuner when the synchronous signal is not present in the first broadcast signal.

According to another aspect of the invention, the method may further include finely adjusting the frequency of the retuned first channel when the right turning point is present in the second broadcast signal.

According to another aspect of the invention, the method may further include storing the finely adjusted frequency and a channel number of the first channel.

According to another aspect of the invention, the method may further include retuning a second channel using the second tuner after the frequency of the retuned first channel is finely adjusted.

According to another aspect of the invention, the method may further include sequentially tuning a plurality of other channels using the first tuner.

According to another aspect of the invention, the method may further include immediately retuning a second channel using the second tuner when the right tuning point is not present in the second broadcast signal.

According to another aspect of the invention, the method may further include determining the presence of a right tuning point in a fourth broadcast signal of the second channel through the second tuner.

According to another aspect of the invention, the method may further include storing a channel number and a receiving frequency of the first channel tuned through the first or second tuner.

BRIEF DESCRIPTION OF THE DRAWINGS

These and other aspects and advantages of the invention will become apparent and more readily appreciated from the following description of exemplary embodiments thereof, taken in conjunction with the accompany drawings in which.

DETAILED DESCRIPTION OF EXEMPLARY EMBODIMENTS

Reference will now be made in detail to exemplary embodiments of the invention, examples of which are illustrated in the accompanying drawings, wherein like reference numerals refer to like elements throughout. The exemplary embodiments are described below to assist the understanding of the invention, and are not intended to limit the scope of the invention in any way.

Figure 1:
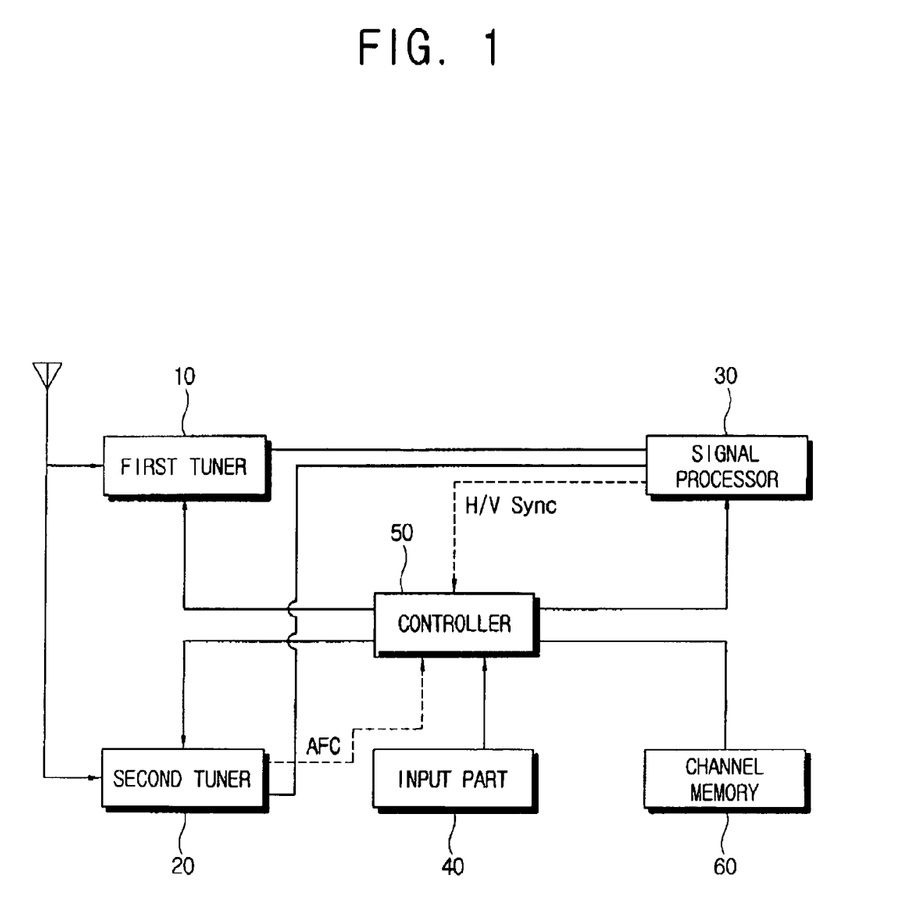
FIG. 1 is a block diagram of a broadcast receiving apparatus according to an exemplary embodiment of the invention.

FIG. 1 is a block diagram of a broadcast receiving apparatus according to an exemplary embodiment of the invention.

As shown therein, a broadcast receiving apparatus includes a first tuner 10 and a second tuner 20 to search and tune broadcasted channels corresponding to particular frequencies; a signal processor 30 to process broadcast signals of tuned ones of the broadcasted channels tuned by the first and second tuners 10 and 20; an input part 40 outputting an input signal depending on a user's selection; and a controller 50 to control the first and second tuners 10 and 20, the signal processor 30 and the input part 40.

The broadcast receiving apparatus picks up a broadcast signal through either of the first tuner 10 or the second tuner 20, and outputs the broadcast signal to a display. The controller 50 controls the signal processor 30 to process the broadcast signal received through the first and second tuners 10 and 20 to be displayed using a PIP function. Thus, while the PIP function is running, desired broadcast signals are selectively received through the respective tuners, and displayed as a PIP through the display. The broadcast receiving apparatus can be provided in various devices such as a TV, a VTR, a PC, and other display apparatuses, and may include a connection interface to connect with an external device or an external display apparatus.

The signal processor 30 includes an intermediate frequency processor (not shown) to extract a video signal and an audio signal from the broadcast signals of the receiving channels tuned by the first and second tuners 10 and 20. Further, the signal processor 30 includes an audio signal processor (not shown) and a video signal processor (not shown) to supply the audio signal and the video signal from the intermediate frequency processor to an outside element. Also, the signal processor 30 comprises a PIP processor (not shown) to process the broadcast signals received through the first and second tuners 10 and 20 to be displayed as the PIP in the display. Alternatively, a plurality of signal processors may be provided to individually process the broadcast signals received through the first and second tuners 10 and 20.

The broadcast receiving apparatus performs a channel preset operation with regard to all channels, sets available channels, and stores information about the set channels in a channel memory 60. This information includes receiving frequencies and channel numbers of the channels tuned by the first tuner 10 and the second tuner 20.

According to this embodiment, the first tuner 10 receives the broadcasted channels, and is controlled by the controller 50 to quickly search a first channel of the broadcasted channels corresponding to a first frequency. Then, while the first tuner 10 quickly searches the remaining channels of the broadcasted channels, the second tuner 20 is controlled by the controller 50 to retune and finely search the first channel tuned by the first tuner 10.

The input part 40 allows a user to select a desired channel or a channel searching mode for starting the channel preset operation. Thus, command signals output from the input part 40 are transmitted to the controller 50, which controls tuner 10, tuner 20 and the signal processor 30. Further, the input part 40 may allow a user to select a volume control, a display adjustment, or the like. The input part 40 may comprise an input key, a remote controller, or the like, or a separate menu window.

The signal processor 30 extracts a synchronous signal from the broadcast signals of the particular channels tuned by the first and second tuners 10 and 20. The signal processor 30 may comprise a synchronous signal processor (not shown) to divide the synchronous signal into a horizontal synchronous signal and a vertical synchronous signal.

The controller 50 receives the command signal for the channel searching mode from the input part 40 and controls the first and second tuners 10 and 20 to respectively quickly and finely search the broadcast signals. Further, the controller 50 determines whether the broadcast signal of the particular channel tuned by the first tuner 10, which is output from the signal processor 30, includes a synchronous signal. When the broadcast signal includes such a synchronous signal, the controller 50 causes the receiving frequency and a temporary channel number of the particular channel to be temporarily stored in the channel memory 60. Then, the controller 50 controls the first tuner 10 to sequentially tune to another channel of the broadcasted channels On the other hand, when the broadcast signal includes no such synchronous signal, the controller 50 controls the first tuner 10 to simply sequentially tune to another channel of the broadcasted channels.

Returning to the case where a synchronous signal is detected, the controller 50 controls the second tuner 20 to retune the particular channel corresponding to the temporary channel number stored in the channel memory 60. Then, the signal processor 30 processes the synchronous signal with regard to a broadcast signal of the particular channel tuned through the second tuner 20. Then, the controller 50 receives the processed synchronous signal from the signal processor 30, and finely searches the corresponding receiving frequency, thereby determining whether there is a right tuning point f0.

When the receiving frequency of the broadcast signal corresponding to the particular channel retuned through the second tuner 20 has a right tuning point f0, the controller 50 finely adjusts the frequency of the particular channel and controls the channel memory 60 to store the finely adjusted receiving frequency and the decided channel number of the particular channel. Then, the controller 50 controls the second tuner 20 to retune other adjacent channels corresponding to other temporary channel numbers stored in the channel memory 60, to thereby perform the channel preset operation.

On the other hand, when the receiving frequency of the broadcast signal corresponding to the particular channel retuned through the second tuner 20 has no right tuning point f0, the controller 50 controls the second tuner 20 to retune other adjacent channels corresponding to other temporary channel numbers stored in the channel memory 60, and to again finely search for a right tuning point f0, thereby performing the channel preset operation.

Figure 2:
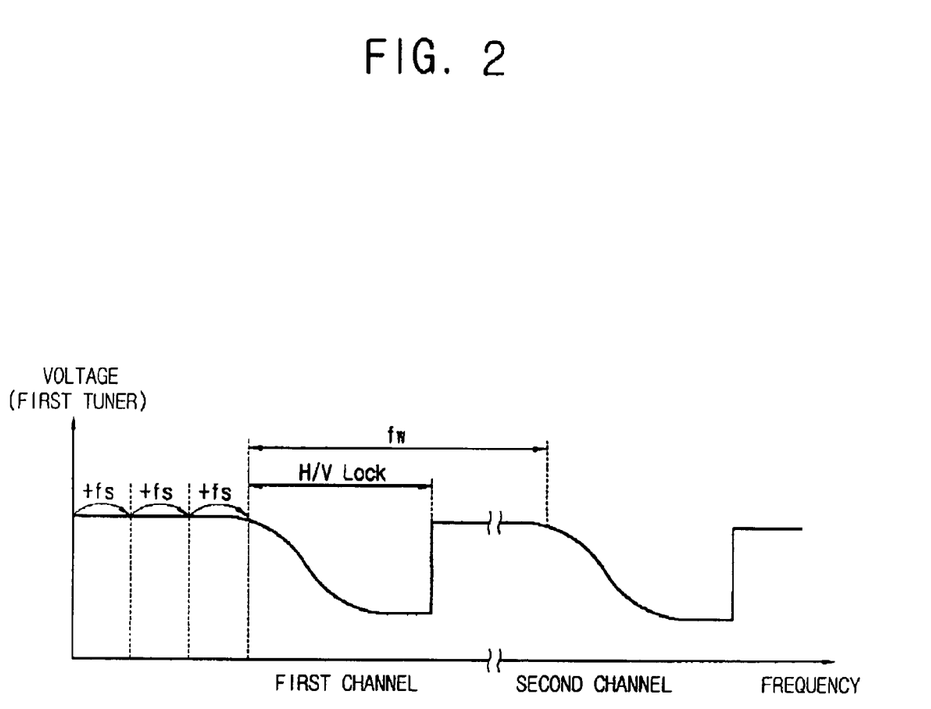
FIG. 2 is a graph of when a channel quick-searching operation is performed in the broadcast receiving apparatus according to an exemplary embodiment of the invention.
Figure 4:
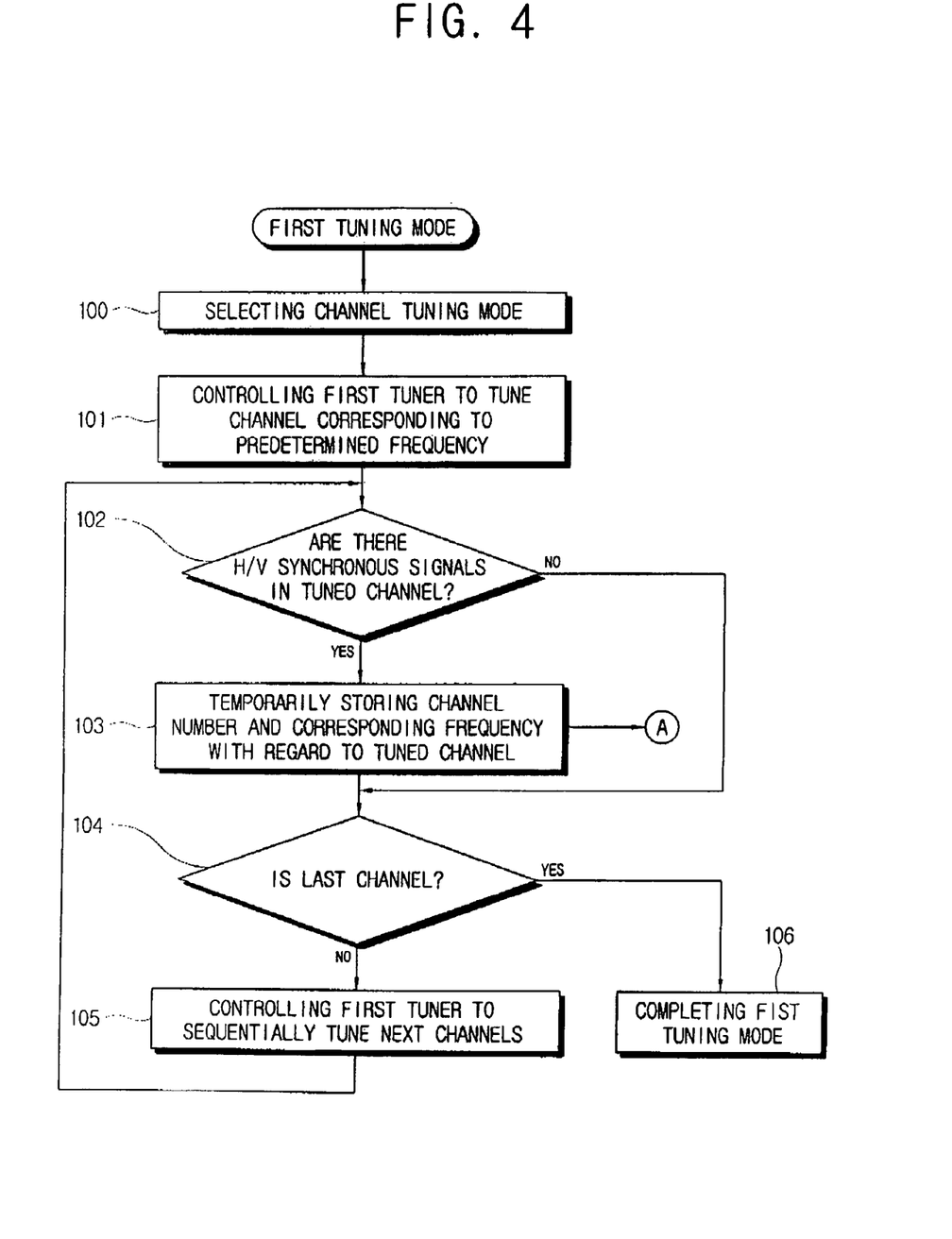
FIG. 4 is a control flowchart of when the channel quick-searching operation is performed in the broadcast receiving apparatus according to an exemplary embodiment of the invention.

Meanwhile, a channel quick-searching operation (hereinafter, referred to as a 'first tuning mode') using the first tuner 10 will be described with reference to FIGS. 2 and 4.

In the first tuning mode, at operation 100, a user selects the channel searching mode through the input part 40. At operation 101, the controller 50 controls the first tuner 10 to tune a first channel, corresponding to a first predetermined frequency, to provide a first broadcast signal. At operation 102, the controller 50 repeatedly checks whether the first broadcast signal includes a synchronous signal, at predetermined first frequency width intervals, as the signal processor 30 processes the first broadcast signal of the first channel tuned through the first tuner 10.

When it is determined in operation 102 that the first broadcast signal includes a synchronous signal (refer to "H/V Lock" in FIG. 2), the controller 50 controls the channel memory 60 to store a first temporary channel number and a first receiving frequency of the first channel having the synchronous signal in operation 103. In contrast, when it is determined in operation 102 that no synchronous signal is present, the controller proceeds directly to operation 104.

In operation 104, the controller 50 determines whether the first channel is the last channel of the broadcasted channels. If so, the controller 50 stops the first tuning mode in operation 106. If not, the controller proceeds to operation 105.

Lastly, in operation 105, the controller 50 stops searching the first channel and skips a predetermined second frequency width fw corresponding to a frequency interval between respective channels of the broadcasted channels, to thereby search a second channel after the lapse of a predetermined delay time required for stabilizing the first tuner 10. Here, the second frequency width fw is an integer multiple of the first frequency width fs. For example, when the first frequency width is 1 MHz, the second frequency width may be 3 MHz.

Successively, the controller 50 checks whether a second broadcast signal of the second channel next to the first channel includes a synchronous signal. Likewise, the controller 50 checks whether further broadcast signals of further channels include a synchronous signal, in sequence. According to the channel quick-searching operation, the controller 50 controls the channel memory 60 to store the temporary channel number and the corresponding frequency of each channel having a synchronous signal.

Figure 3:
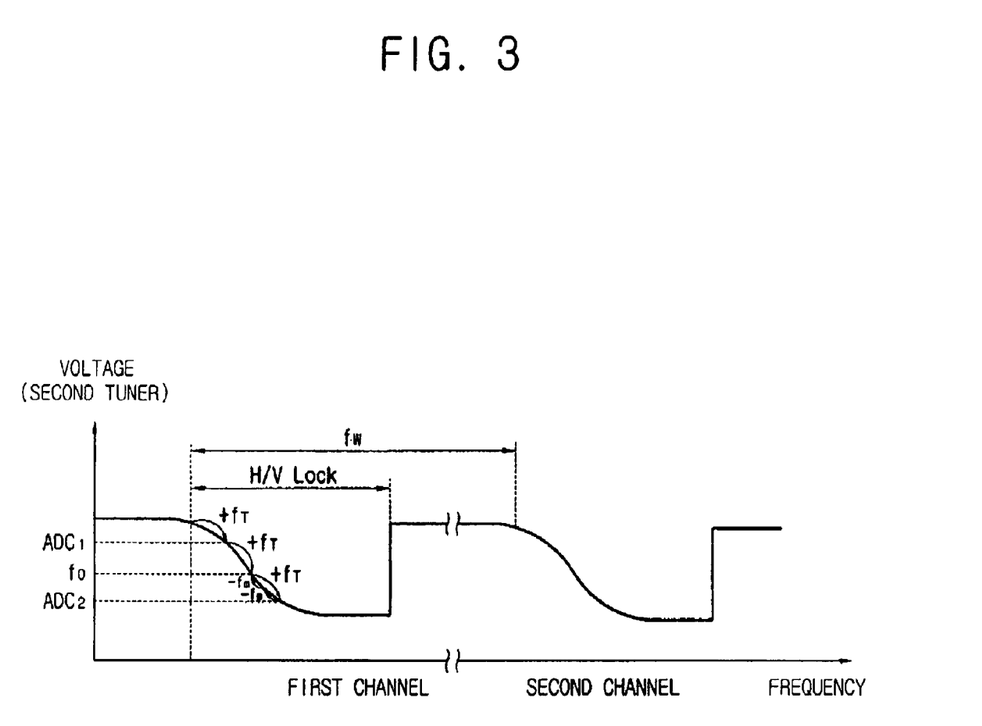
FIG. 3 is a graph of when a channel fine-searching operation is performed in the broadcast receiving apparatus according to an embodiment of the invention.
Figure 5:
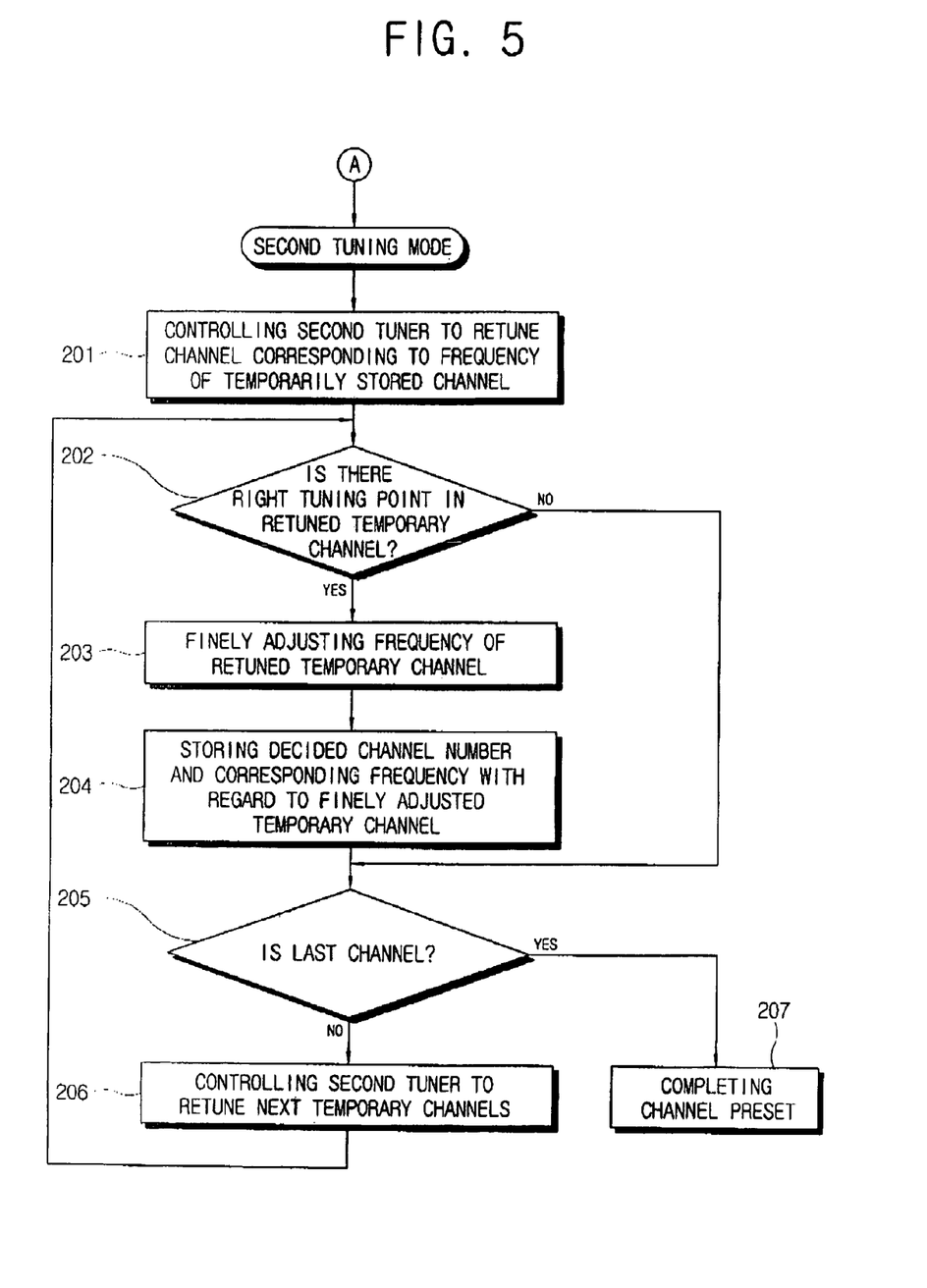
FIG. 5 is a control flowchart of when the channel fine-searching operation is performed in the broadcast receiving apparatus according to an exemplary embodiment of the invention.

Also, a channel fine-searching operation (hereinafter, referred to as a 'second tuning mode') using the second tuner 20 will be described with reference to FIGS. 3 and 5.

As discussed above, the first frequency corresponding to the first temporary channel number is stored in the channel memory 60 at the operation 103 of the first tuning mode, based on the channel quick-searching operation using the first tuner 10. Then, at operation 200, the controller 50 controls the second tuner 20 and the signal processor 30 to perform the second tuning mode. Here, the second tuning mode and the first tuning mode can be performed at the same time.

At operation 201, the controller 50 controls the second tuner 50 to retune the first channel having the synchronous signal that is temporarily stored in the channel memory 60. At operation 202, the controller 50 receives the synchronous signal processed by the signal processor 30 with respect to a second broadcast signal of the first channel retuned by the second tuner 20, and repeatedly checks whether the corresponding receiving frequency has the right tuning point (refer to fo in FIG. 3) at a third frequency width ft intervals. At this time, the third frequency width ft can be set to be lower than the first frequency width fs. For example, when the first frequency width is 1 MHz, the third frequency width may be 125 KHz.

Here, the right tuning point f0 is a voltage level corresponding to information about a tuning point fed back from the second tuner 220 to the controller 50. The right tuning point f0 is determined on the basis of a voltage level related to automatic frequency control (AFC). As shown in FIG. 3, the right tuning point f0 is an approximately intermediate value between an upper limit and a lower limit of the AFC voltage level. Thus, the controller 50 further comprises an analog-digital converter (ADC) to convert an AFC signal as the information about the tuning point given by the second tuner 20 into a voltage level.

When the receiving frequency has the right tuning point fO, at operation 203, the controller 50 finely adjusts the receiving frequency of the receiving channel retuned through the second tuner 20. At this time, a predetermined fourth frequency width fin is finely adjusted to be increased (+fin) or decreased (−fin) on the basis of difference between the right tuning point fo and the voltage levels ADC1, ADC2 corresponding to the tuning point of the second tuner 20 obtained by converting the AFC signal through the ADC, so that the receiving frequency is equal to the right tuning point f0. Here, the fourth frequency width fin can be a half of the third frequency width ft. For example, when the third frequency width is 125 KHz, the fourth frequency width can be 62.5 KHz.

Next, at operation 204, the controller 50 controls the channel memory 60 to store the finely adjusted first temporary channel number as the decided channel number and store the frequency corresponding thereto. Alternatively, the decided channel number and the finely adjusted frequency can be stored by renewing the first temporary channel number and its receiving frequency.

Next at operation 205, the controller 50 determines whether the first channel retuned through the second tuner 20 is the last channel of the broadcasted channels or not. If so, at operation 207, the controller 50 stops the channel searching mode. If not, operation 206 is performed.

In operation 206, the controller 50 stops searching the first temporarily stored channel, and tunes a second temporarily stored channel being apart from the first temporarily stored channel by the second frequency width fw corresponding to a frequency interval between the channels after the lapse of a predetermined delay time required for stabilizing the second tuner 20, to thereby check again whether the receiving frequency has the right tuning point f0.

Further, the controller 50 repeats the foregoing operations in sequence with regard to other temporarily stored channels, so that the second tuner 20 applies the channel fine-searching operation to the other channels, to thereby store other decided channel numbers and the finely adjusted receiving frequencies in the channel memory 60.

As described above, the broadcast receiving apparatus according to an exemplary embodiment of the invention employs the first tuner 10 and the second tuner 20 to perform, respectively, the first tuning mode for the channel quick-searching operation and the second tuning mode for the channel fine-searching operation at the same time with regard to all channels, so that the channel preset is more quickly performed. In the foregoing embodiments, the broadcast receiving apparatus employs the first tuner 10 to perform the first tuning mode and the second tuner 20 to perform the second tuning mode, but not limited to. Alternatively, the first tuner 10 may be employed for the second tuning mode, and the second tuner 20 may be employed for the first tuning mode.

When a user selects a desired channel through the input part 40 after the channel preset is completed, the controller 50 controls the tuner 10 and tuner 20 to receive the broadcast signals corresponding to the receiving frequencies of the selected receiving channels stored in the channel memory 60, so that the broadcast signals are displayed as a single picture or the PIP in a separate display apparatus such as the TV or the like.

As described above, the invention provides a broadcast receiving apparatus and a control method thereof, in which a plurality of tuners performs respectively a channel quick-searching operation and a channel fine-searching operation at the same time, so that receiving channels are quickly and accurately searched, thereby performing a channel preset. According to the invention, the time taken to perform the channel preset is effectively reduced in the case where though the number of available channels is very large.

Although a few embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A broadcast receiving apparatus comprising:
    a first tuner to tune a first channel;
    a second tuner to retune the first channel; and
    a controller to determine the presence of a synchronous signal in a first broadcast signal of the first channel tuned through the first tuner, and to determine a right tuning point in a second broadcast signal of the first channel retuned through the second tuner.

2. The broadcast receiving apparatus according to claim 1, wherein the controller temporarily stores a temporary channel number and a receiving frequency of the first channel when the synchronous signal is determined to be present in the first broadcast signal.

3. The broadcast receiving apparatus according to claim 2, wherein the controller controls the second tuner to retune the first channel using the stored temporary channel number and frequency.

4. The broadcast receiving apparatus according to claim 1, further comprising an input part to allow a user to select a channel searching mode, wherein the first tuner operates according to the selected channel searching mode.

5. The broadcast receiving apparatus according to claim 1, wherein the controller controls the first tuner to tune a second channel while the second tuner retunes the first channel.

6. The broadcast receiving apparatus according to claim 5, wherein the controller determines the presence of a synchronous signal in a third broadcast signal of the second channel through the first tuner.

7. The broadcast receiving apparatus according to claim 1, wherein the controller controls the first tuner to immediately tune a second channel when the synchronous signal is not present in the first broadcast signal.

8. The broadcast receiving apparatus according to claim 7, wherein the controller determines the presence of a synchronous signal in a third broadcast signal of the second channel through the first tuner.

9. The broadcast receiving apparatus according to claim 1, wherein the controller finely adjusts the frequency of the retuned first channel when the right tuning point is present in the second broadcast signal.

10. The broadcast receiving apparatus according to claim 9, wherein the controller stores the finely adjusted frequency and a channel number of the first channel.

11. The broadcast receiving apparatus according to claim 9, wherein the controller controls the second tuner to retune a second channel after the frequency of the retuned first channel is finely adjusted.

12. The broadcast receiving apparatus according to claim 1, wherein the controller controls the first tuner to sequentially tune a plurality of other channels.

13. The broadcast receiving apparatus according to claim 8, wherein the controller controls the second tuner to immediately retune a second channel when the right tuning point is not present in the second broadcast signal.

14. The broadcast receiving apparatus according to claim 13, wherein the controller determines the presence of a right tuning point in a fourth broadcast signal of the second channel through the second tuner.

15. The broadcast receiving apparatus according to claim 1, further comprising a channel memory to store a channel number and a receiving frequency of the first channel tuned through the first or second tuner.

16. A method of controlling a broadcast receiving apparatus comprising first and second tuners, the method comprising:
tuning a first channel using the first tuner;
determining the presence of a synchronous signal in a first broadcast signal of the first channel tuned through the first tuner;
retuning the first channel using the second tuner; and determining the presence of a right tuning point in a second broadcast signal of the first channel retuned through the second tuner.

17. The method according to claim 16, further comprising temporarily storing a temporary channel number and a frequency of the first channel when the synchronous signal is determined to be present in the first broadcast signal.

18. The method according to claim 17, wherein retuning the first channel using the second tuner comprises tuning the second tuner using the stored temporary channel number and frequency.

19. The method according to claim 16, further comprising selecting a channel searching mode to be performed according to user inputs through an input part, wherein the tuning of the first channel using the first tuner is performed according to the selected channel searching mode.

20. The method according to claim 16, further comprising tuning a second channel using the first tuner while the retuning of the first channel using the second tuner occurs.

21. The method according to claim 20, further comprising determining the presence of a synchronous signal in a third broadcast signal of the second channel through the first tuner.

22. The method according to claim 16, further comprising immediately tuning a second channel using the first tuner when the synchronous signal is not present in the first broadcast signal.

23. The method according to claim 22, further comprising determining the presence of a synchronous signal in a third broadcast signal of the second channel through the first tuner.

24. The method according to claim 16, further comprising finely adjusting the frequency of the retuned first channel when the right tuning point is present in the second broadcast signal.

25. The method according to claim 24, further comprising storing the finely adjusted frequency and a channel number of the first channel.

26. The method according to claim 24, further comprising retuning a second channel using the second tuner after the frequency of the retuned first channel is finely adjusted.

27. The method according to claim 16, further comprising sequentially tuning a plurality of other channels using the first tuner.

28. The method according to claim 16, further comprising immediately retuning a second channel using the second tuner when the right tuning point is not present in the second broadcast signal.

29. The method according to claim 28, further comprising determining the presence of a right tuning point in a fourth broadcast signal of the second channel through the second tuner.

30. The method according to claim 16, further comprising storing a channel number and a receiving frequency of the first channel tuned through the first or second tuner.

31. The broadcast receiving apparatus according to claim 1, wherein the right tuning point is a voltage level corresponding to information about a tuning point fed back from the second tuner.

32. The broadcast receiving apparatus according to claim 1, wherein the right tuning point is an intermediate value between an upper limit and a lower limit of an automatic frequency control (AFC) voltage level. Pg,22

33. The method according to claim 16, wherein the right tuning point is a voltage level corresponding to information about a tuning point fed back from the second tuner.

34. The method according to claim 16, wherein the right tuning point is an intermediate value between an upper limit and a lower limit of an automatic frequency control (AFC) voltage level.

* * * * *

UNITED STATES PATENT AND TRADEMARK OFFICE
CERTIFICATE OF CORRECTION

PATENT NO. : 7,643,098 B2  Page 1 of 1
APPLICATION NO. : 11/288228
DATED : January 5, 2010
INVENTOR(S) : Tae-hwan Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-first Day of December, 2010

David J. Kappos
*Director of the United States Patent and Trademark Office*